DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 7, 1975

939 O.G. 11

T939,015
VOLTAGE REGULATING SYSTEM
Katsumi Itoh, Ohbu, Japan, assignor to Nippondenso Co., Ltd., Aichi-ken, Japan
Filed July 26, 1974, Ser. No. 492,968
Claims priority, application Japan, July 26, 1973, 48/88,505
**Int. Cl. H02j *7/14***
U.S. Cl. 320—64
1 Sheet Drawing. 6 Pages Specification

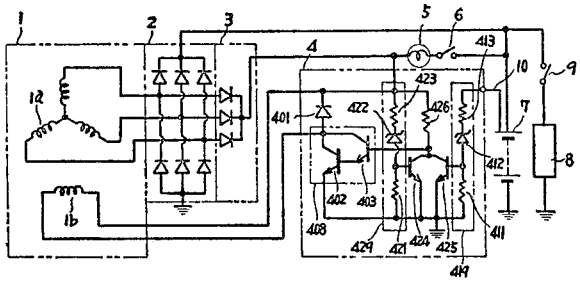

In a voltage regulating system, a plurality of voltage sensing circuits are provided to control a voltage generated by an alternator at a predetermined value even when one of the sensing circuits is disconnected or disordered, thus preventing a battery from being over charged perfectly.

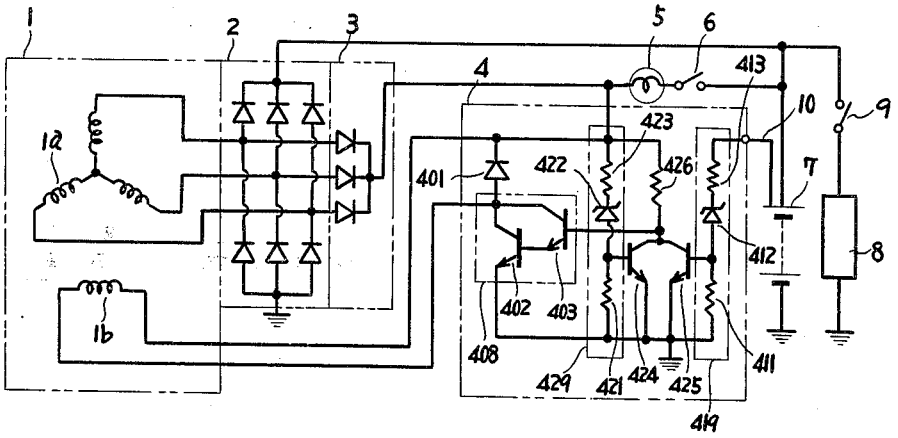

Oct. 7, 1975
K. ITOH
VOLTAGE REGULATING SYSTEM
Original Filed July 26, 1974
T939,015